(12) United States Patent
Gampel et al.

(10) Patent No.: US 11,973,693 B1
(45) Date of Patent: Apr. 30, 2024

(54) SYMMETRIC RECEIVE-SIDE SCALING (RSS) FOR ASYMMETRIC FLOWS

(71) Applicant: International Business Machines Corporation, Armonk, NY (US)

(72) Inventors: Eran Gampel, Tel aviv (IL); Liran Schour, Haifa (IL); Guy Laden, Tel aviv (IL); Marc Cochran, Shrewsbury, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/182,714

(22) Filed: Mar. 13, 2023

(51) Int. Cl.
*H04L 47/52* (2022.01)
*H04L 47/80* (2022.01)
*H04L 61/256* (2022.01)

(52) U.S. Cl.
CPC .......... *H04L 47/521* (2013.01); *H04L 47/801* (2013.01); *H04L 61/256* (2013.01)

(58) Field of Classification Search
CPC .... H04L 47/521; H04L 47/801; H04L 61/256
See application file for complete search history.

(56) References Cited

U.S. PATENT DOCUMENTS

| | | | |
|---|---|---|---|
| 9,569,383 B2 | 2/2017 | Domsch et al. | |
| 10,454,946 B2 | 10/2019 | Chao et al. | |
| 10,469,569 B2 | 11/2019 | Chao et al. | |
| 10,944,717 B2 | 3/2021 | Zhu et al. | |
| 10,951,524 B1 | 3/2021 | Mao et al. | |
| 10,958,718 B2 | 3/2021 | Chao et al. | |
| 11,394,804 B2 | 7/2022 | Marom | |
| 2008/0077792 A1 | 3/2008 | Mann | |
| 2009/0006521 A1 | 1/2009 | Veal et al. | |

(Continued)

OTHER PUBLICATIONS

Woo, et al, "Scalable TCP Session Monitoring with Symmetric Receive-side Scaling", KAIST, Department of Electrical Engineering, 2012, 7 pages.

(Continued)

*Primary Examiner* — Austin J Moreau
*Assistant Examiner* — Chhian (Amy) Ling
(74) *Attorney, Agent, or Firm* — Cantor Colburn LLP; Tihon Poltavets

(57) ABSTRACT

A computer-implemented method for distributing packets for asymmetrical traffic by a network interface card (NIC). The computer-implemented method includes obtaining information of an incoming packet incoming from a source endpoint behind a stateful service and accessing a destination endpoint using a network address translation (NAT) service, hashing the information to calculate queue identification for the packet to direct the packet to the queue associated therewith, executing a NAT on an outgoing packet associated with the incoming packet to allow for retrieval of the queue identification from a header of the outgoing packet, sending the outgoing packet to the destination endpoint, which is responsive with a return packet, stamping the queue identification to the return packet upon the return packet being transmitted back from the destination endpoint and the queue identification being retrieved and instantiating an RSS override operation to redirect the return packet to the queue on the response.

20 Claims, 7 Drawing Sheets

(56) References Cited

U.S. PATENT DOCUMENTS

| | | | |
|---|---|---|---|
| 2009/0323703 A1* | 12/2009 | Bragagnini | H04L 63/0209 |
| | | | 370/401 |
| 2012/0215932 A1 | 8/2012 | Shemesh | |
| 2014/0059111 A1* | 2/2014 | Veeraiyan | H04L 67/10 |
| | | | 709/201 |
| 2015/0067229 A1 | 3/2015 | Connor et al. | |
| 2015/0207738 A1 | 7/2015 | Cornett et al. | |
| 2017/0093792 A1* | 3/2017 | Marom | H04L 61/2514 |
| 2018/0285151 A1* | 10/2018 | Wang | G06F 9/5083 |
| 2019/0109858 A1 | 4/2019 | Chao et al. | |
| 2019/0334863 A1 | 10/2019 | Medvedkin et al. | |
| 2021/0224138 A1 | 7/2021 | Wang | |
| 2022/0006734 A1 | 1/2022 | Wang et al. | |

OTHER PUBLICATIONS

Wu, et al, "A Transport-Friendly NIC for Multicore/Multiprocessor Systems", IEEE Transactions on Parallel and Distributed Systems, vol. 23, 2011, 14 pages.

\* cited by examiner

SYMMETRIC RECEIVE-SIDE SCALING (RSS) FOR ASYMMETRIC FLOWS

BACKGROUND

The present invention generally relates to receive-side scaling (RSS), and more specifically, to symmetric RSS for asymmetric flows of tuples using a stateless RSS override.

RSS allows a receive side network load from a network adapter to be shared across many processors to avoid a single-processor bottleneck. The RSS functionality is provided by network interface hardware. In RSS processes, arriving packets are stored in a same flow (per supported protocol) into a same hardware queue of a modern network interface card (NIC) and processing of the received packets is made scalable by allowing exclusive access to NIC queues by each available central processing unit (CPU) core. This removes lock contention when accessing the NIC queues and allows for concurrent access to different queues by multiple CPU cores.

In symmetric RSS, a same processor/queue is selected to handle two sides of a connection. This is enabled by a special hash function (for example, the Toeplitz hash function) that supports symmetrical flows. This hash function takes two inputs: a static hash key and tuples which are extracted from the corresponding packet.

SUMMARY

Embodiments of the present invention are directed to a computer-implemented method for distributing packets for asymmetrical traffic by a network interface card (NIC). The computer-implemented method includes obtaining information of an incoming packet incoming from a source endpoint behind a stateful service and accessing a destination endpoint using a network address translation (NAT) service, hashing the information to calculate queue identification for the packet to direct the packet to the queue associated therewith, executing a NAT on an outgoing packet associated with the incoming packet to allow for retrieval of the queue identification from a header of the outgoing packet, sending the outgoing packet to the destination endpoint, which is responsive with a return packet, stamping the queue identification to the return packet upon the return packet being transmitted back from the destination endpoint and the queue identification being retrieved and instantiating an RSS override operation to redirect the return packet to the queue on the response.

As a result of an execution of the computer-implemented method, asymmetrical traffic is directed to a same queue of a same computing core on the NIC.

In accordance with additional or alternative embodiments of the invention, the header information is a tuple and a hashing function to execute the hashing is a static function applied to the tuple.

In accordance with additional or alternative embodiments of the invention, the asymmetrical traffic is provided in a multi-tenant user datagram protocol (UDP) of a networked system and the NIC includes source endpoints on a first side of the NIC and uplink ports on a second side of the NIC. The destination endpoint is communicative with one of the uplink ports via a logical cluster edge.

In accordance with additional or alternative embodiments of the invention, the method further includes allocating a network address translation (NAT) port based on a static function.

In accordance with additional or alternative embodiments of the invention, the networked system further includes a control unit configured to allocate a network address translation (NAT) port range based on a dynamic function.

In accordance with additional or alternative embodiments of the invention, the control unit is configured to allocate the NAT port range by at least one of using a static index to calculate the queue identification and generating the queue identification as metadata.

Embodiments of the invention further provide computer program products and computer systems having substantially the same features and technical benefits as the above-described computer-implemented methods.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Turning now to an overview of technologies that are more specifically relevant to aspects of the invention, RSS allows for an efficient distribution of network processing across multiple receive queues and thereby allows traffic to be processed by multiple queues. In symmetric RSS, a same processor/queue is selected to handle two sides of a connection in what is referred to as symmetrical flow. This is enabled by a special hash function (for example, the Toeplitz hash function) that supports symmetrical flows. This special hash function takes two inputs: a static hash key and tuples which are extracted from the corresponding packet. This allows for lockless processing because there is no state contention between processing cores.

Figure 1:
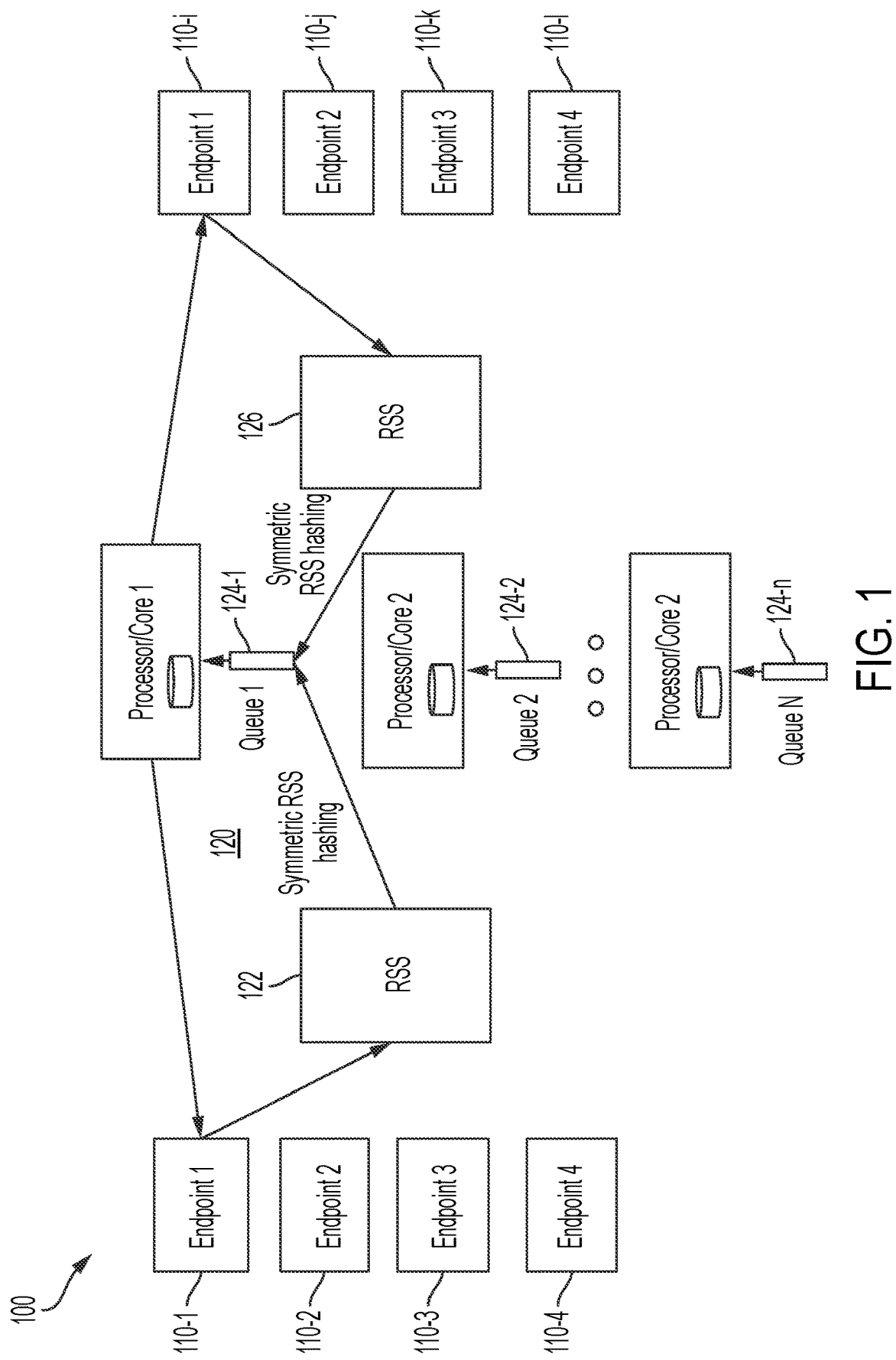
FIG. 1 is a schematic diagram of a system with a network device handling packets received from endpoints on two sides of a network in a symmetric case.

FIG. 1 depicts an exemplary and non-limiting schematic block diagram of a system 100 handling packets received from nodes on two sides of a network. A plurality of nodes or endpoints 110-1, 110-2, 110-3 and 110-4 are provided on one side of a network device 120 and a plurality of nodes or endpoints 110-i, 110-j, 110-k and 110-1 are provided on the other side of the network device 120. The network device 120 includes an RSS router 122 to which the endpoints 110-1, 110-2, 110-3 and 110-4 are connected and an RSS router 126 to which the endpoints 110-i, 110-j, 110-k and 110-1 are connected. Each of the RSS router 122 and RSS router 126 can be implemented as a symmetric RSS router. The network device 120 further includes queues 124-1, 124-2, . . . , 124-n. Due to the symmetric RSS provided by the RSS router 122 and the RSS router 126, a same tuple value will result in a same queue allocation. For example, a packet traveling from endpoint 110-1 that is routed to queue 124-1 will also have the response packet from endpoint 110-i routed to queue 124-1 because the symmetric RSS ensures that a same hash is generated for the same tuple.

Figure 2:
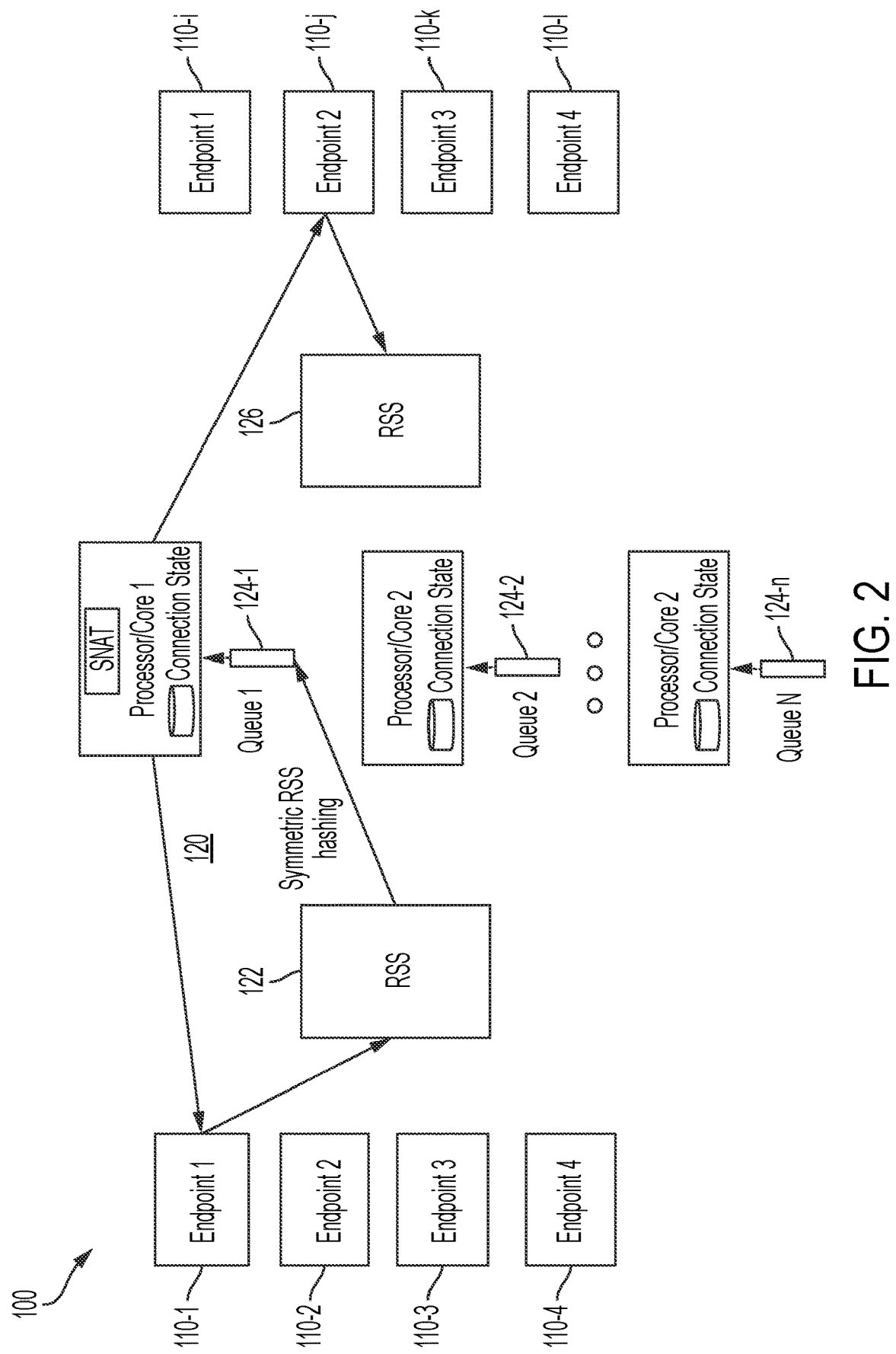
FIG. 2 is a schematic diagram of a system with a source network address translation (SNAT) network device handling packets received from nodes on two sides of a network in an asymmetric case.

While RSS processing works in cases in which the flow tuple is symmetric as shown in FIG. 1 (i.e., egress flow: RSS→SRC IP X, DST IP Y, SRC Port Z, DST Port T, Protocol and ingress flow: RSS→SRC IP Y, DST IP X, SRC Port T, DST Port Z, Protocol), RSS processing will not work for asymmetric flow tuples because the symmetric RSS hash is based on the symmetricity of the tuple. This is illustrated in the source network address translation (SNAT) case of FIG. 2 in which an incoming packet traveling from endpoint 110-1 that is routed to queue 124-1 will not have a response packet from endpoint 110-j routed to queue 124-1. Instead, the response packet from 110-j will be routed to queue 124-2 because the asymmetric RSS will ensure that a different hash is generated for the different tuple.

That is, RSS processing will not work properly in cases of network address translated (NATed) traffic where egress flow tuples and ingress flow tuples are not symmetric. For example, a transmission control protocol (TCP) flow from a private internet protocol (IP) address A to a public IP address B will be processed by a queue according to egress 5-tuple: hash(<TCP, IP X, IP Y, PORT Z, PORT T>)=queue 1 whereas, on the return flow, the packet is NATed so the processing queue will be chosen according to the following 5-tuple: hash(<TCP, IP Y, IP W, PORT T, PORT S>)=queue 3.

Current RSS solutions for asymmetric flow tuples for NATed traffic across multiple cores all have drawbacks as they tend to focus on stateful correlations on a smart network interface card (NIC) between ingress flows and egress flows using a shared secret. Some other solutions make use of shared memory across multiple cores and use a Lock( )(Mutex) to handle multi-core "safety." An issue with this approach, is that can dramatically reduce system performance. Some solutions make use of replication of state operations across multiple cores. An issue with this solution is that it tends to be complex with relatively high latency and memory costs. Still other solutions have one core to handle all "stateful" traffic and redirect traffic to that core using software queues. An issue here is increased complexity and a performance limit to the single core.

Turning now to an overview of the aspects of the invention, one or more embodiments of the invention address shortcomings of the above-described approach by providing for a programmable RSS override solution. The RSS override solution addresses the problem of asymmetrical RSS for asymmetric flow tuples by using a new stateless RSS for asymmetric traffic on a smart NIC. The stateless RSS uses additional packet header information on ingress to retrieve or calculate a core/queue ID to be selected for the corresponding flow on egress RSS.

The above-described aspects of the invention address the shortcomings of known approaches by providing for a computer-implemented method for distributing packets for asymmetrical traffic by a network interface card (NIC). The computer-implemented method includes obtaining header information of an incoming packet, which is incoming from an endpoint behind a stateful service and which is accessing a service using an exposed network address translation (NAT) service, hashing the header information to calculate a queue identification for the packet to direct the packet to the queue associated with the queue identification, stamping the queue identification to the packet upon the packet being transmitted to the service and instantiating an RSS override operation to redirect the packet to the queue on the response from the service.

An execution of the computer-implemented method thus allows a static function to calculate core/queue identification (ID) for a packet tuple that is NATed and allows a cluster entry point (i.e., a logical cluster ingress edge) to redirect the traffic in an un-modified condition to the host associated with the core/queue ID by stamping the packet with an RSS override action. In addition, an intelligent port allocation controller can be used in a cluster having static knowledge of the core/queue ID with a port range or a specific host machine. This can allow the cluster entry point to redirect the traffic in the un-modified condition to the host associated with the core/queue ID.

Figure 3:
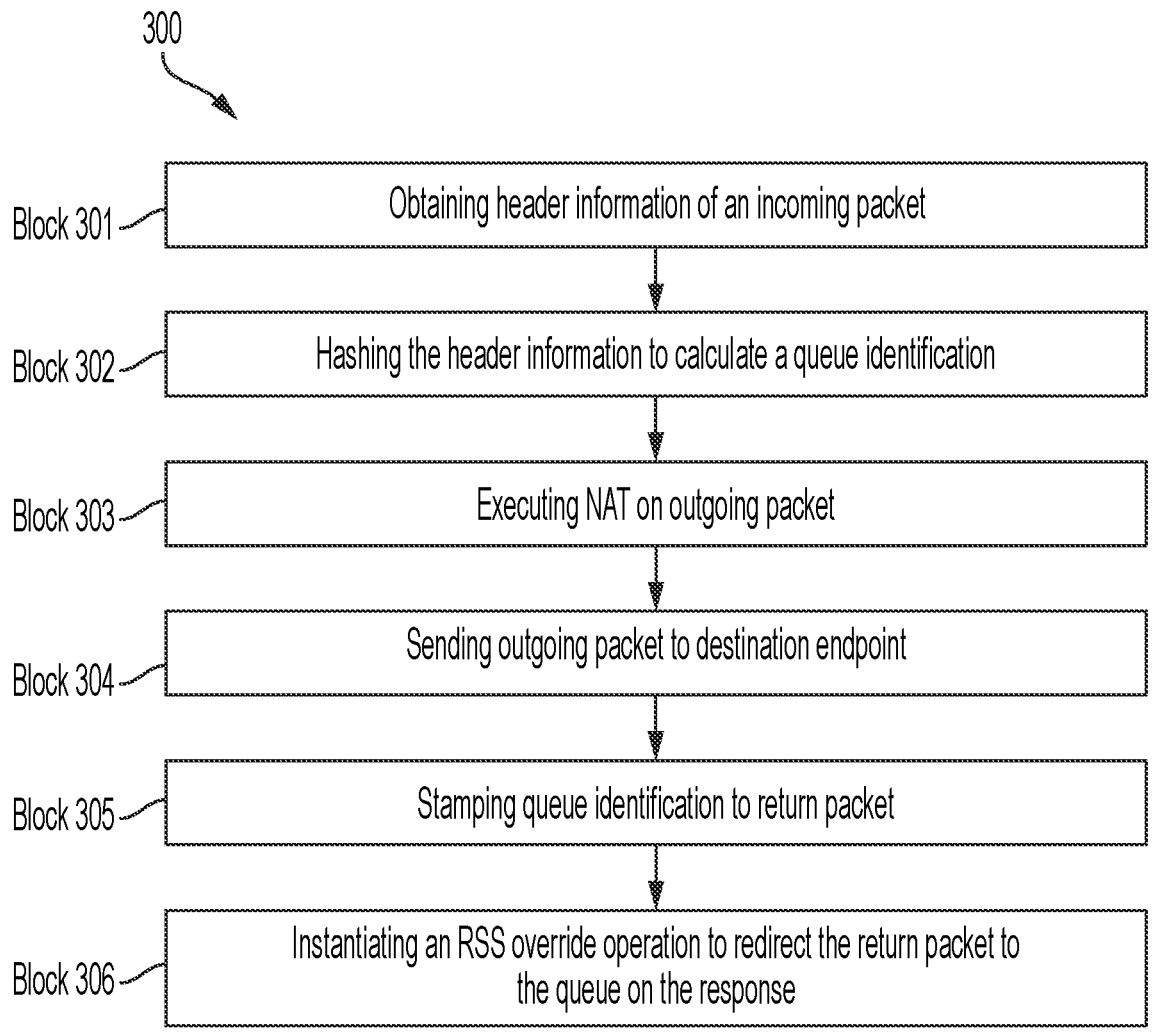
FIG. 3 is a flow diagram illustrating a computer-implemented method for distributing packets for asymmetrical traffic by a network interface card (NIC) in accordance with one or more embodiments of the present invention.

Turning now to a more detailed description of aspects of the present invention, FIG. 3 illustrates a computer-implemented method 300 for distributing packets for asymmetrical traffic by a network interface card (NIC). The computer-implemented method 300 includes obtaining header information of an incoming packet incoming from a source endpoint behind a stateful service and accessing a destination endpoint using an exposed network address translation (NAT) service (block 301), hashing the header information to calculate a queue identification for the packet to direct the packet to the queue associated with the queue identification (block 302), executing a NAT on an outgoing packet associated with the incoming packet to allow for retrieval of the queue identification from a network header of the outgoing packet (block 303), sending the outgoing packet to the destination endpoint, which is responsive with a return packet (block 304), stamping the queue identification to the return packet upon the return packet being transmitted back from the destination endpoint and the queue identification being retrieved from the network header (block 305) and instantiating an RSS override operation to redirect the return packet to the queue on the response (block 306).

In accordance with one or more embodiments of the present invention, the header information is a tuple, such as a 5-tuple (TCP, IP X, IP Y, PORT Z, PORT T), and a hashing function to execute the hashing is a static function applied to the tuple. The asymmetrical traffic can be provided in, for example, a multi-tenant user datagram protocol (UDP) of a networked system. In these or other cases, the NIC can include endpoints on a first side of the NIC and uplink ports on a second side of the NIC, where the service is communicative with one of the uplink ports via a logical cluster edge and one or more of the uplink ports can be allocated based on a static function. The allocating can be executed by a control unit that is configured to allocate a network address translation (NAT) port range based on a dynamic function by at least one of using a static index to calculate the queue identification and by generating the queue identification as metadata.

Figure 4:
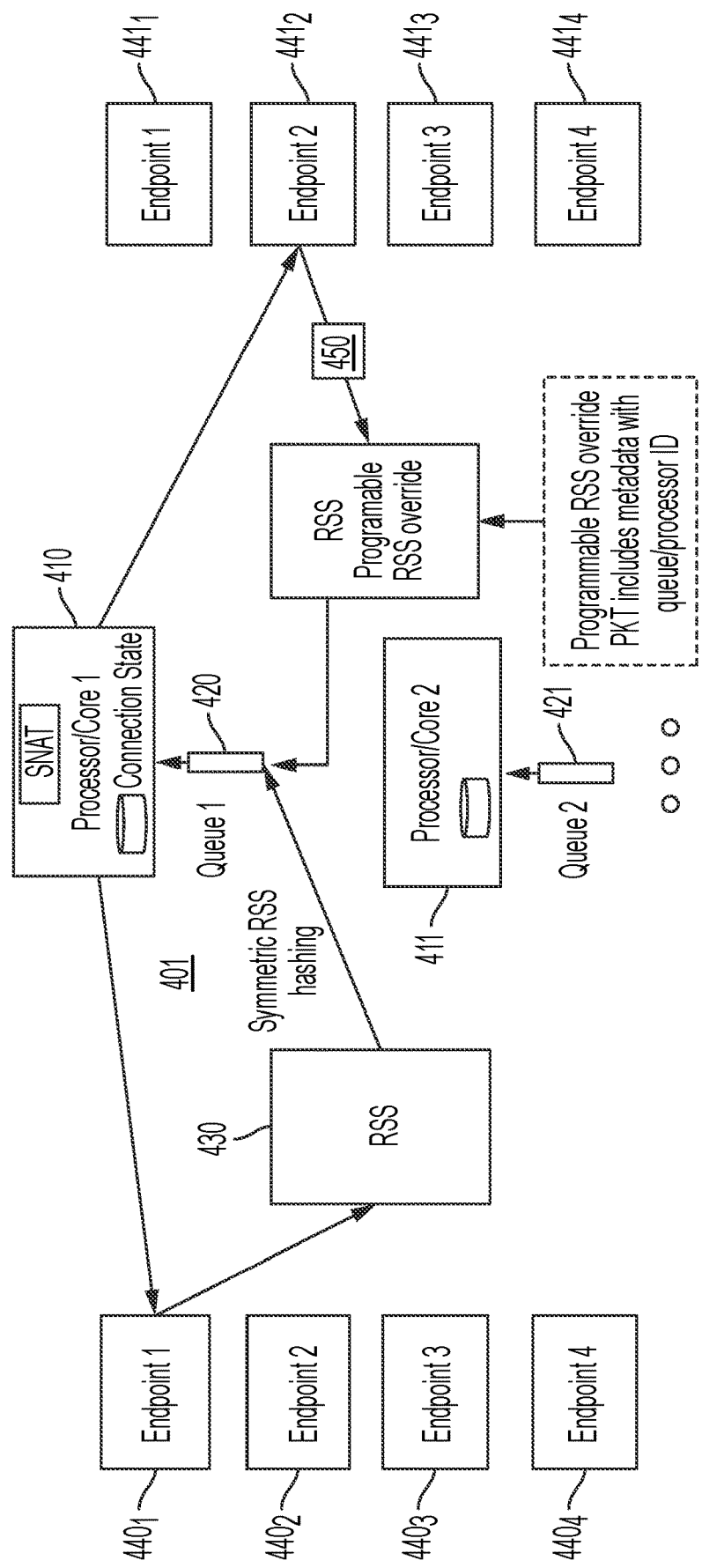
FIG. 4 is a schematic diagram of an NIC that operates according to the computer-implemented method of FIG. 3 in accordance with one or more embodiments of the present invention.

With reference to FIG. 4, an instance of the computer-implemented method 300 of FIG. 3 is illustrated graphically. As shown in FIG. 4, an NIC 401 can include, but is not required to include, multiple processor/cores 410, 411 (there may be several additional processor/cores), each with a queue 420, 421 and an RSS unit 430. In an alternative case, the NIC 401 can include the queues 420, 421 and the RSS unit 430 with the processor/cores 410, 411 being provided on another platform, such as a motherboard central processor unit (CPU). The following description will relate to the former case. In an exemplary case, the processor/core 410 can be used for source network address translation (SNAT) or stateful NAT. The NIC 401 can also include source endpoints 44014 and destination endpoints $441_{1-4}$ on either side of the processor/cores 410, 411. The source endpoints $440_{1-4}$ can be provided as virtual machines (VMs) or as containers running on a motherboard CPU. The destination endpoints $441_{1-4}$ can be provided as destination endpoints that are communicative with uplink ports or as uplink ports as described in greater detail below.

As used herein, network address translation (NAT) is used to map an IP address space into another by modifying network address information in the IP header of packets while they are in transit across a traffic routing device. Often, multiple private hosts are mapped to one publicly exposed IP address. This is referred to as "stateful NAT" or "one-to-many NAT." In stateful NAT, a local network uses one of the designated private IP address subnets, the network has a router having both a private and a public address. The private address is used by the router for communicating with other devices in the private local network. The public address is used by the router for communicating with the rest of the Internet. As traffic passes from the network to the Internet, the router translates the source address in each packet from a private address to the router's own public address. The router tracks basic data about each active connection (particularly the destination address and port). When the router receives inbound traffic from the Internet, it uses the connection tracking data that it stored during the outbound phase to determine to which private address (if any) it should forward the reply.

All IP packets have a source IP address and a destination IP address. Typically, packets passing from the private network to the public network will have their source address modified, while packets passing from the public network back to the private network will have their destination address modified. To avoid ambiguity in how replies are translated, further modifications to the packets can be required. The vast bulk of Internet traffic uses transmission control protocol (TCP) or user datagram protocol (UDP) in which port numbers are changed so that the combination of IP address (within the IP header) and port number (within the transport layer header) on the returned packet can be unambiguously mapped to the corresponding private network destination.

Returning to FIG. 4, in a case in which the NIC 401 is operating as a stateful NAT, the source endpoint $440_1$ can operate as a session initiator behind the NAT and can be attempting to access a service or a destination endpoint that is not part of the NIC 401 at or by way of one of the endpoints $441_{1-4}$ or uplink ports. As shown in FIG. 4, an incoming packet is sent to a service from source endpoint $440_1$ as a component of the session and includes header information in the form of a tuple. This tuple is hashed by a static hashing function in the RSS unit 430 to produce an output, including queue identification, that determines where the packet will be sent, in the case of FIG. 4, queue 420 of processor/core 410. A NAT is then executed on an outgoing packet, which is associated with the incoming packet, in such a way as to allow retrieval of the queue information from a network header of the outgoing packet. The outgoing packet is then sent to the destination endpoint $441_2$. Upon the outgoing packet being returned from the destination endpoint $441_2$ as a return packet and upon the queue identification being retrieved from the network header of the outgoing packet, the return packet is stamped with the queue ID of queue 420 of processor/core 410 by network stamping entity 450. This stamping causes the NIC 401 to instantiate an RSS override operation, which reads the queue ID from the return packet and redirects the return packet to the queue 420 of processor/core 410. If not for the RSS override, the asymmetricity of the case illustrated in FIG. 4, the return packet would possibly be sent to another one of the queues and processors/cores.

Figure 5:
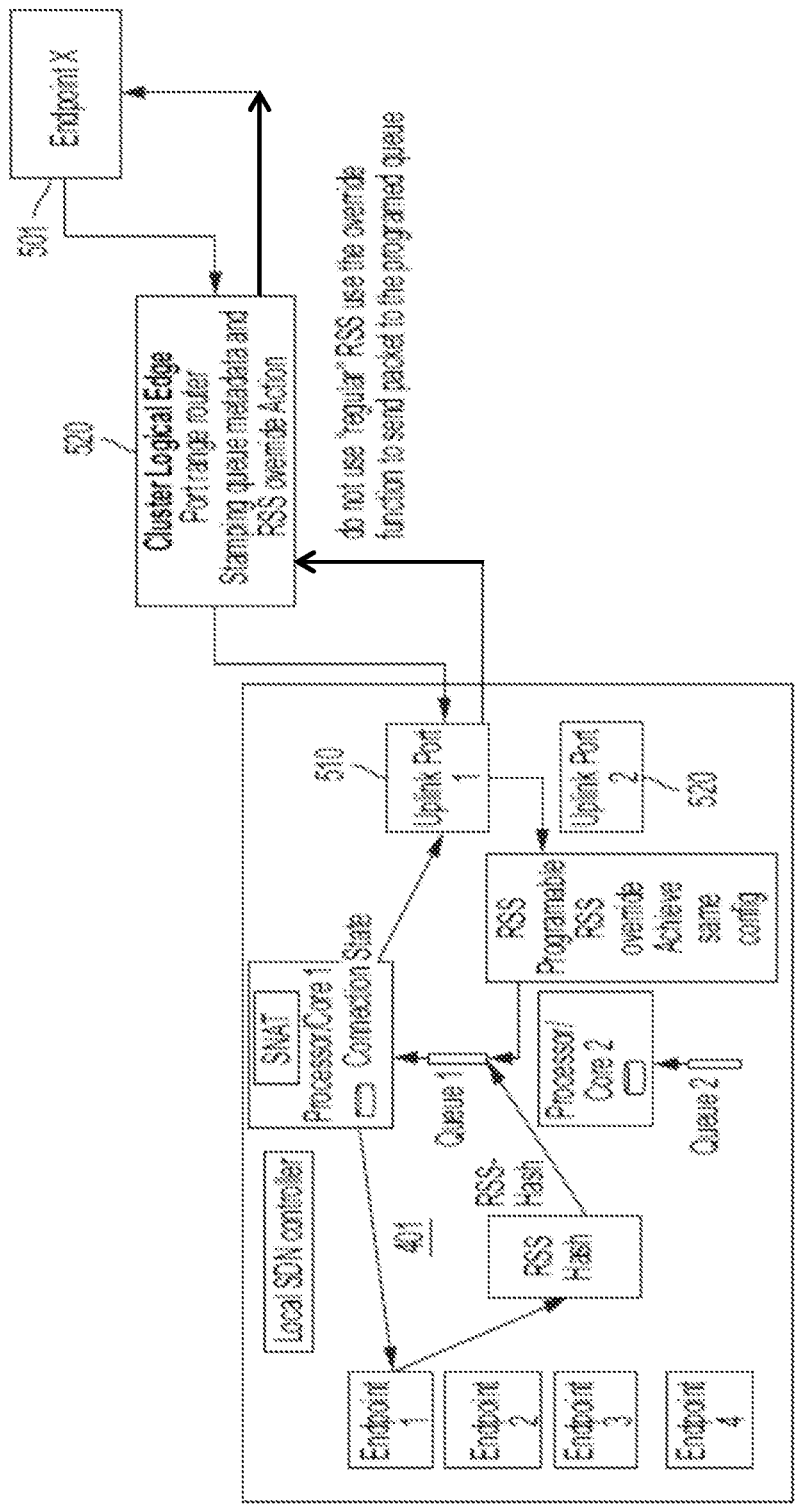
FIG. 5 is a schematic diagram of the NIC of FIG. 4 operating as a stateful NAT in a multi-tenant user datagram protocol (UDP), transmission control protocol (TCP) stateful case in accordance with one or more embodiments of the present invention.
Figure 6:
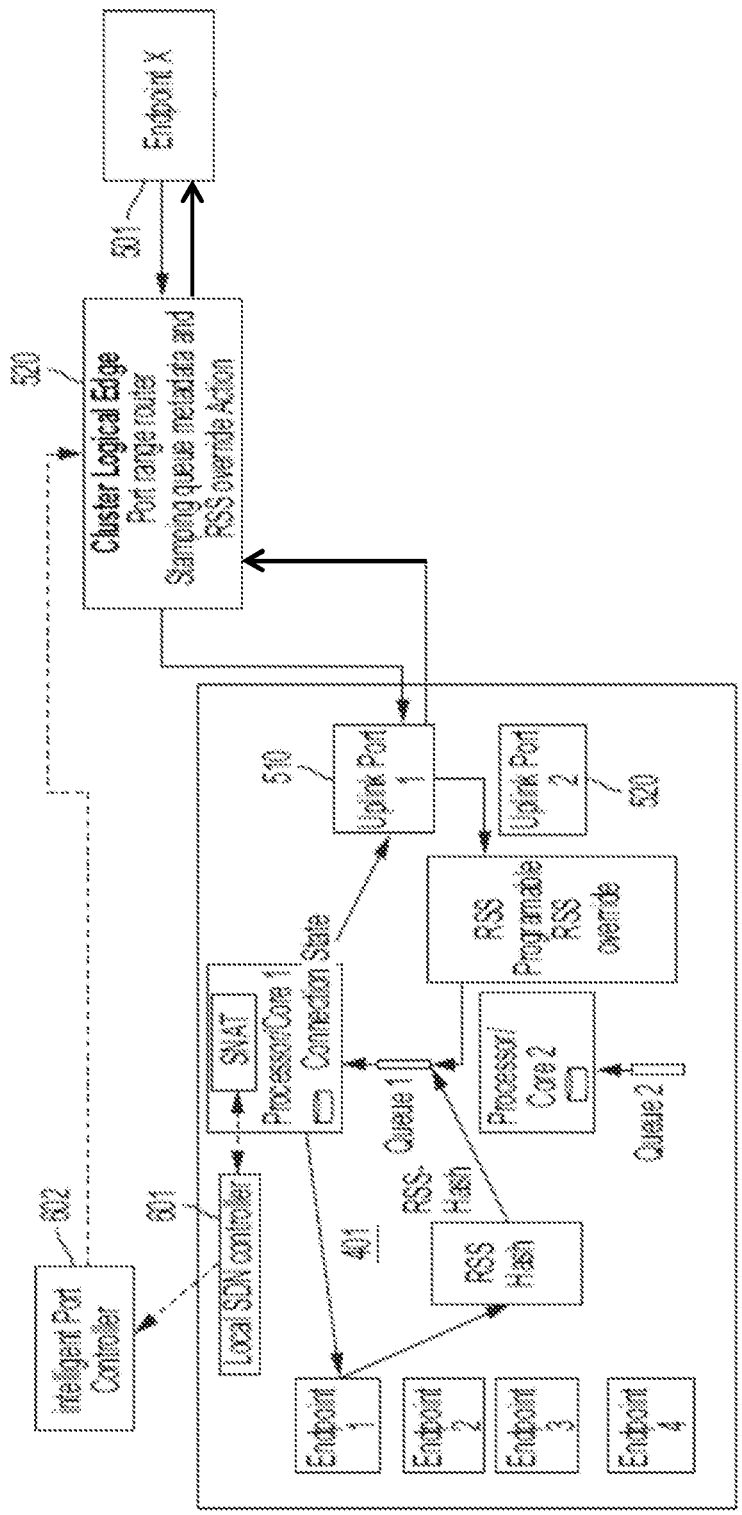
FIG. 6 is a schematic diagram of the NIC of FIG. 4 operating as a stateful NAT in a multi-tenant user datagram protocol (UDP), transmission control protocol (TCP) stateful case in accordance with one or more embodiments of the present invention.

With continued reference to FIG. 4 and with additional reference to FIGS. 5 and 6, certain cases of sessions of the NIC 401 of FIG. 4 operating as a stateful NAT are provided as multi-tenant UDP, TCP stateful NAT cases. As shown in FIGS. 5 and 6, destination endpoint X 501 is a service that source endpoint $440_1$ is attempting to access via one of the uplink ports 510, 511 and the cluster logical edge 520. The cluster logical edge 520 is communicatively interposed between the destination endpoint X 501 and the one of the uplink ports 510, 511 and can be provided as an entity on the network, such as a port range router, with data or static functionality to stamp a packet base of L4/L3 tuples of the packet with queue metadata and RSS override instructions.

In FIG. 5, an incoming packet is received at the queue 420 as described above and the processor/core 410 allocates one of the uplink ports 510, 511 to the packet by use of a static function (StaticAlloc [Host ID, Core ID, NAT GW, NATed tuples]=port). In the case of FIG. 5, this static function allocates uplink port 510 to the packet. The packet is then sent from the uplink port 510 to the destination endpoint X 501 and the response, which can be provided as a return packet is subsequently received from the destination endpoint X 501 by the uplink port 510 via the cluster logical edge 520. The cluster logical edge 520 then stamps the return packet with the ID of the queue 420 of the processor/core 410 using a stateless function (GetQueueID [NAT GW, port, NATed tuples]=coreID or GetQueueID [port_num]=port_num % 4).

In some cases, there can be a one-to-one relationship between the static function and the stateless function (i.e., a static allocation algorithm, for example a % modular operator). As an example, if there are four operating cores, a port can always be statically allocated to a core according to the flowing logic: core 0, which is connected to queue 0 will always get ports—queue port % 4=0; core 1, which is connected to queue 1 will always get ports—queue port % 4=1; core 2, which is connected to queue 2 will always get ports—queue port % 4=2.

In FIG. 6, a local software defined network (SDN) controller 601 is provided in communication with the processor/core 410 on the NIC 401 and an intelligent port controller 602 is interposed between the SDN controller 601 and the cluster logical edge 520. The SDN controller 601 is configured to allocate a NAT port range to the packet based on a dynamic function Alloc [hosted, core-id, protocol, num ports]=port range) and uses a static index to calculate the queue ID of the queue to which the response packet is to be sent. This queue ID can be generated as metadata that is stamped to the packet by the cluster logical edge 520. The port range and the queue ID metadata can be transmitted to the cluster logical edge 520 by the intelligent port controller 602.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 7:
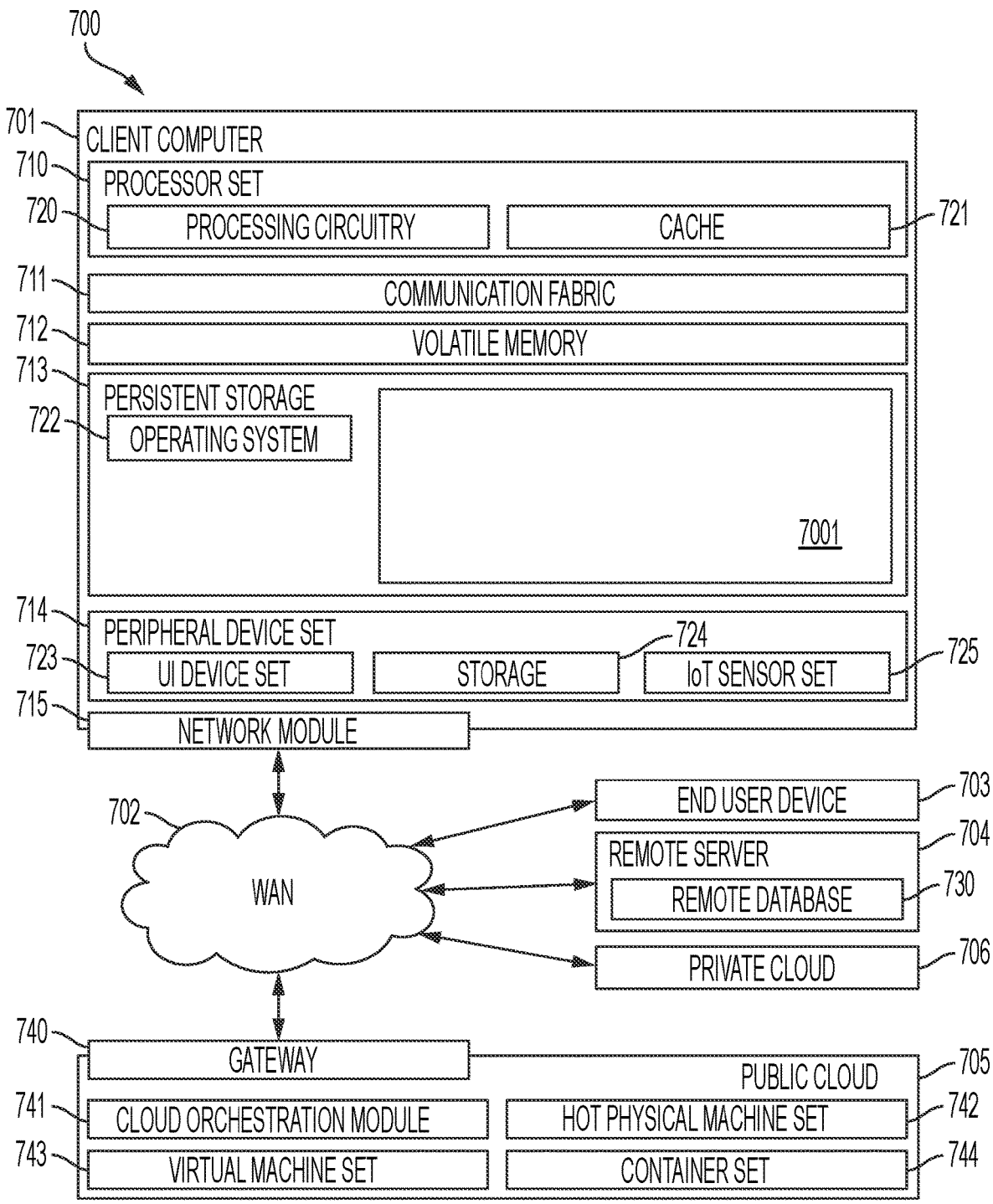
FIG. 7 is a schematic diagram of a computing environment for executing the computer-implemented method of FIG. 3 in accordance with one or more embodiments of the present invention.

With reference to FIG. 7, a computer or computing device 700 that implements the computer-implemented method 300 of FIG. 3 in accordance with one or more embodiments of the present invention is provided. The computer or computing device 700 of FIG. 7 contains an example of an environment for the execution of at least some of the computer code involved in performing the inventive methods, such as the block 7001 of the computer-implemented method 300 of FIG. 3 for processing data connection requests. In addition to the computer-implemented method 300 of block 7001, the computer or computing device 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and the computer-implemented method 300 of block 7001, as identified above), peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

The computer 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of the computer-implemented method 300, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

The processor set 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip."

In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In the computer-implemented method 300, at least some of the instructions for performing the inventive methods may be stored in the block 7001 of the computer-implemented method 300 in persistent storage 713.

Communication fabric 711 is the signal conduction path that allows the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 712 is any type of volatile memory now known or to be developed in the future. Examples include dynamic type random access memory (RAM) or static type RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

Persistent storage 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface-type operating systems that employ a kernel. The code included in the block 7001 of the computer-implemented method 300 typically includes at least some of the computer code involved in performing the inventive methods.

Peripheral device set 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

Network module 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

Remote server 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

Public cloud 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for distributing packets for asymmetrical traffic by a network interface card (NIC), the computer-implemented method comprising:

obtaining header information of an incoming packet incoming from a source endpoint behind a stateful service and accessing a destination endpoint, which is not part of the NIC, using an exposed network address translation (NAT) service;

hashing the header information to calculate queue identification comprising a queue identification (ID) for the packet to direct the packet to a queue, which is associated with the queue identification and the queue ID and which is one of multiple queues, wherein the queue ID comprises a queue ID associated to a processor;

executing a NAT on an outgoing packet associated with the incoming packet to allow for retrieval of the queue identification and the queue ID from a network header of the outgoing packet;

sending the outgoing packet to the destination endpoint, which is responsive with a return packet;

stamping the queue identification and the queue ID to the return packet by a cluster logical edge entity, which is interposed between the destination endpoint and an uplink port of the NIC, upon the return packet being transmitted back from the destination endpoint and the queue identification and the queue ID being retrieved from the network header;

instantiating ana receive side scaling (RSS) override operation, which is caused by the stamping of the queue identification to the return packet, to read the queue ID of the queue identification from the return packet and to redirect the return packet to the queue associated with the queue identification and the queue ID on the response; and redirecting the return packet to the queue associated with the queue identification and the queue ID on the response in accordance with the RSS override operation.

2. The computer-implemented method according to claim 1, wherein the header information is a tuple.

3. The computer-implemented method according to claim 1, wherein a hashing function to execute the hashing is a static function.

4. The computer-implemented method according to claim 1, wherein the asymmetrical traffic is provided in a multi-tenant user datagram protocol (UDP) of a networked system and the NIC comprises:
  source endpoints; and
  the uplink port, which is one of multiple uplink ports,
  the destination endpoint is communicative with the uplink ports via the logical cluster edge entity.

5. The computer-implemented method according to claim 4, wherein the method further comprises allocating a network address translation (NAT) port based on a static function.

6. The computer-implemented method according to claim 4, wherein the networked system further comprises a control unit configured to allocate a network address translation (NAT) port range based on a dynamic function.

7. The computer-implemented method according to claim 6, wherein the control unit is configured to allocate the NAT port range by at least one of:
  using a static index to calculate the queue identification; and
  generating the queue identification as metadata.

8. A computer program product for distributing packets for asymmetrical traffic by a network interface card (NIC), the computer program product comprising one or more computer readable storage media having computer readable program code collectively stored on the one or more computer readable storage media, the computer readable program code being executed by a processor of a computer system to cause the computer system to perform a method comprising:
  obtaining header information of an incoming packet incoming from a source endpoint behind a stateful service and accessing a destination endpoint, which is not part of the NIC, using an exposed network address translation (NAT) service;
  hashing the header information to calculate queue identification comprising a queue identification (ID) for the packet to direct the packet to a queue, which is associated with the queue identification and the queue ID and which is one of multiple queues,
  wherein the queue ID comprises a queue ID associated to the processor;
  executing a NAT on an outgoing packet associated with the incoming packet to allow for retrieval of the queue identification and the queue ID from a network header of the outgoing packet;
  sending the outgoing packet to the destination endpoint, which is responsive with a return packet;
  stamping the queue identification and the queue ID to the return packet by a cluster logical edge entity, which is interposed between the destination endpoint and an uplink port of the NIC, upon the return packet being transmitted back from the destination endpoint and the queue identification and the queue ID being retrieved from the network header; and
  instantiating ana receive side scaling (RSS) override operation, which is caused by the stamping of the queue identification to the return packet, to read the queue ID of the queue identification from the return packet and to redirect the return packet to the queue associated with the queue identification and the queue ID on the response; and
  redirecting the return packet to the queue associated with the queue identification and the queue ID on the response in accordance with the RSS override operation.

9. The computer program product according to claim 8, wherein the header information is a tuple.

10. The computer program product according to claim 8, wherein a hashing function to execute the hashing is a static function.

11. The computer program product according to claim 8, wherein the asymmetrical traffic is provided in a multi-tenant user datagram protocol (UDP) of a networked system and the NIC comprises:
  source endpoints; and
  the uplink port, which is one of multiple uplink ports,
  the destination endpoint is communicative with one of the uplink ports via the logical cluster edge entity.

12. The computer program product according to claim 11, wherein the method further comprises allocating a network address translation (NAT) port based on a static function.

13. The computer program product according to claim 11, wherein the networked system further comprises a control unit configured to allocate a network address translation (NAT) port range based on a dynamic function.

14. The computer program product according to claim 13, wherein the control unit is configured to allocate the NAT port range by at least one of:
  using a static index to calculate the queue identification; and
  generating the queue identification as metadata.

15. A computing system comprising:
a processor;
a memory coupled to the processor; and
one or more computer readable storage media coupled to the processor, the one or more computer readable storage media collectively containing instructions that are executed by the processor via the memory to implement a method for distributing packets for asymmetrical traffic by a network interface card (NIC) comprising:
   obtaining header information of an incoming packet incoming from a source endpoint behind a stateful service and accessing a destination endpoint, which is not part of the NIC, using an exposed network address translation (NAT) service;
   hashing the header information to calculate queue identification comprising a queue identification (ID) for the packet to direct the packet to a queue, which is associated with the queue identification and the queue ID and which is one of multiple queues,
   wherein the queue ID comprises a queue ID associated to the processor;
   executing a NAT on an outgoing packet associated with the incoming packet to allow for retrieval of the queue identification and the queue ID from a network header of the outgoing packet;
   sending the outgoing packet to the destination endpoint, which is responsive with a return packet;
   stamping the queue identification and the queue ID to the return packet by a cluster logical edge entity, which is interposed between the destination endpoint and an uplink port of the NIC, upon the return packet being transmitted back from the destination endpoint and the queue identification and the queue ID being retrieved from the network header;
   instantiating ana receive side scaling (RSS) override operation, which is caused by the stamping of the queue identification to the return packet, to read the queue ID of the queue identification from the return packet and to redirect the return packet to the queue associated with the queue identification and the queue ID on the response; and
   redirecting the return packet to the queue associated with the queue identification and the queue ID on the response in accordance with the RSS override operation.

16. The computing system according to claim 15, wherein the header information is a tuple and a hashing function to execute the hashing is a static function applied to the tuple.

17. The computing system according to claim 15, wherein the asymmetrical traffic is provided in a multi-tenant user datagram protocol (UDP) of a networked system and the NIC comprises:
   source endpoints; and
   the uplink port, which is one of multiple uplink ports,
   the destination endpoint is communicative with the uplink ports via the logical cluster edge entity.

18. The computing system according to claim 15, wherein the method further comprises allocating a network address translation (NAT) port based on a static function.

19. The computing system according to claim 18, wherein the networked system further comprises a control unit configured to allocate a network address translation (NAT) port range based on a dynamic function.

20. The computing system according to claim 19, wherein the control unit is configured to allocate the NAT port range by at least one of:
   using a static index to calculate the queue identification; and
   generating the queue identification as metadata.

* * * * *